Figure 1:
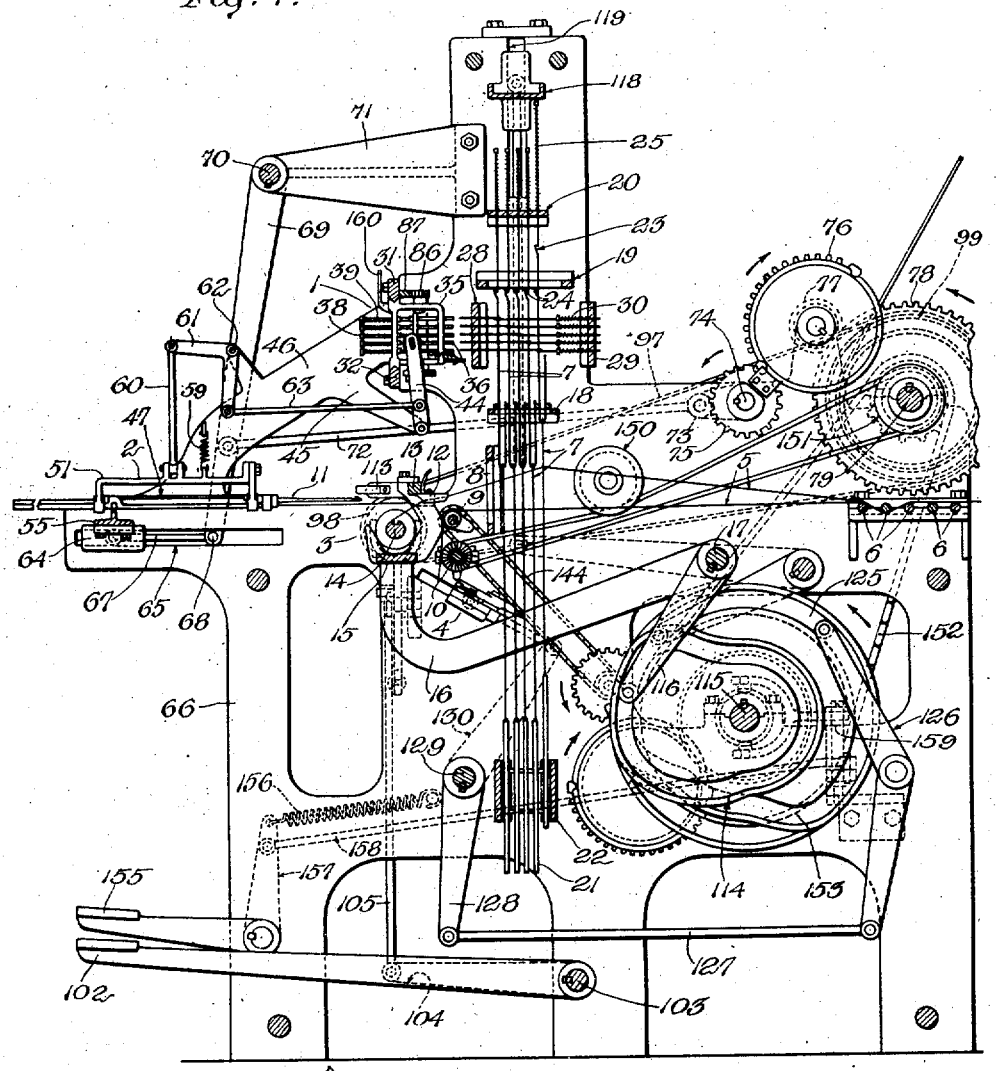

T. P. WALSH.

MACHINE FOR SELECTING, SPOOLING, SHEARING, AND DRAWING IN YARN FOR AXMINSTER LOOMS.

APPLICATION FILED SEPT. 26, 1913.

Reissued Nov. 4, 1913.

6 SHEETS—SHEET 1.

13,640.

Witnesses:
Edward R. Baker
Edward Maxwell

Inventor:
Thomas P. Walsh,
by Geo. S. Maxwell,
Attorneys.

T. P. WALSH.

MACHINE FOR SELECTING, SPOOLING, SHEARING, AND DRAWING IN YARN FOR AXMINSTER LOOMS.

APPLICATION FILED SEPT. 26, 1913.

6 SHEETS—SHEET 2.

Reissued Nov. 4, 1913.

13,640.

T. P. WALSH.

MACHINE FOR SELECTING, SPOOLING, SHEARING, AND DRAWING IN YARN FOR AXMINSTER LOOMS.

APPLICATION FILED SEPT. 26, 1913.

Reissued Nov. 4, 1913.

6 SHEETS—SHEET 3.

13,640.

Witnesses:
Edward R. Barker.
Edward Maxwell.

Inventor:
Thomas P. Walsh,
by Geo. S. Maxwell,
Attorney.

T. P. WALSH.

MACHINE FOR SELECTING, SPOOLING, SHEARING, AND DRAWING IN YARN FOR AXMINSTER LOOMS.

APPLICATION FILED SEPT. 26, 1913.

13,640.

6 SHEETS—SHEET 4.

Reissued Nov. 4, 1913.

Witnesses:
Edward R. Burke
Edward Maxwell

Inventor:
Thomas P. Walsh,
by Geo. H. Maxwell, Attorney.

T. P. WALSH.
MACHINE FOR SELECTING, SPOOLING, SHEARING, AND DRAWING IN YARN FOR AXMINSTER LOOMS.
APPLICATION FILED SEPT. 26, 1913.
Reissued Nov. 4, 1913. 13,640. 6 SHEETS—SHEET 5.
Fig. 6.
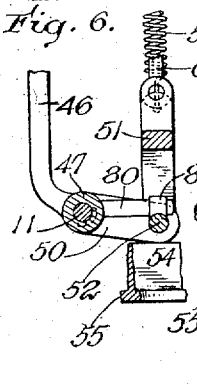
Fig. 7.
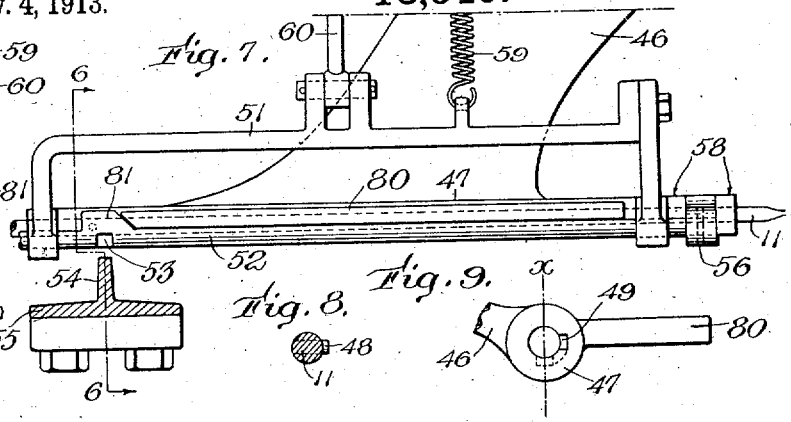
Fig. 8.
Fig. 9.
Fig. 10.
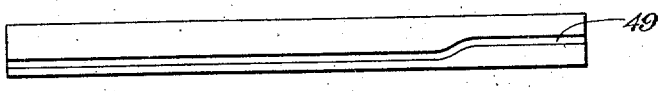
Fig. 11.
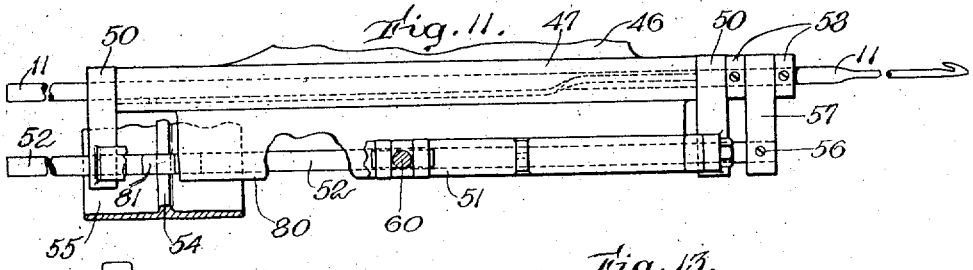
Fig. 12.
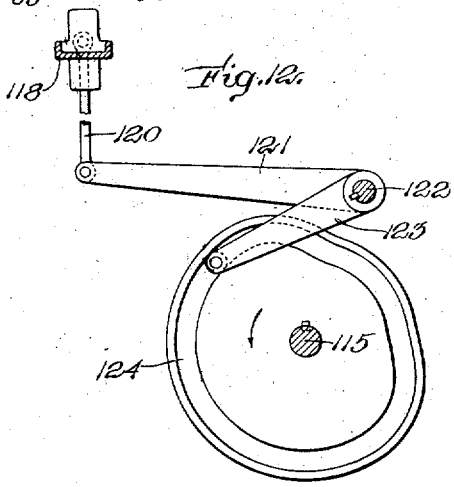
Fig. 13.
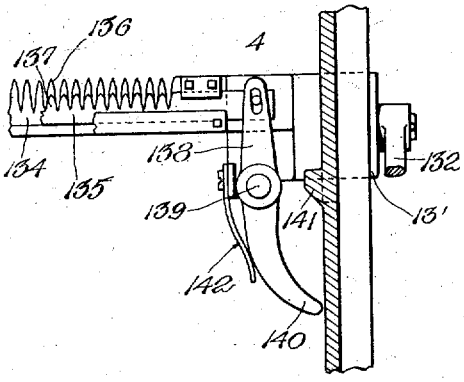
Witnesses.
Edward R. Barker.
Edward Maxwell
Inventor:
Thomas P. Walsh,
by Geo. S. Maxwell,
Attorney.

T. P. WALSH.
MACHINE FOR SELECTING, SPOOLING, SHEARING, AND DRAWING IN YARN FOR AXMINSTER LOOMS.
APPLICATION FILED SEPT. 26, 1913.
Reissued Nov. 4, 1913.
6 SHEETS—SHEET 6.
13,640.
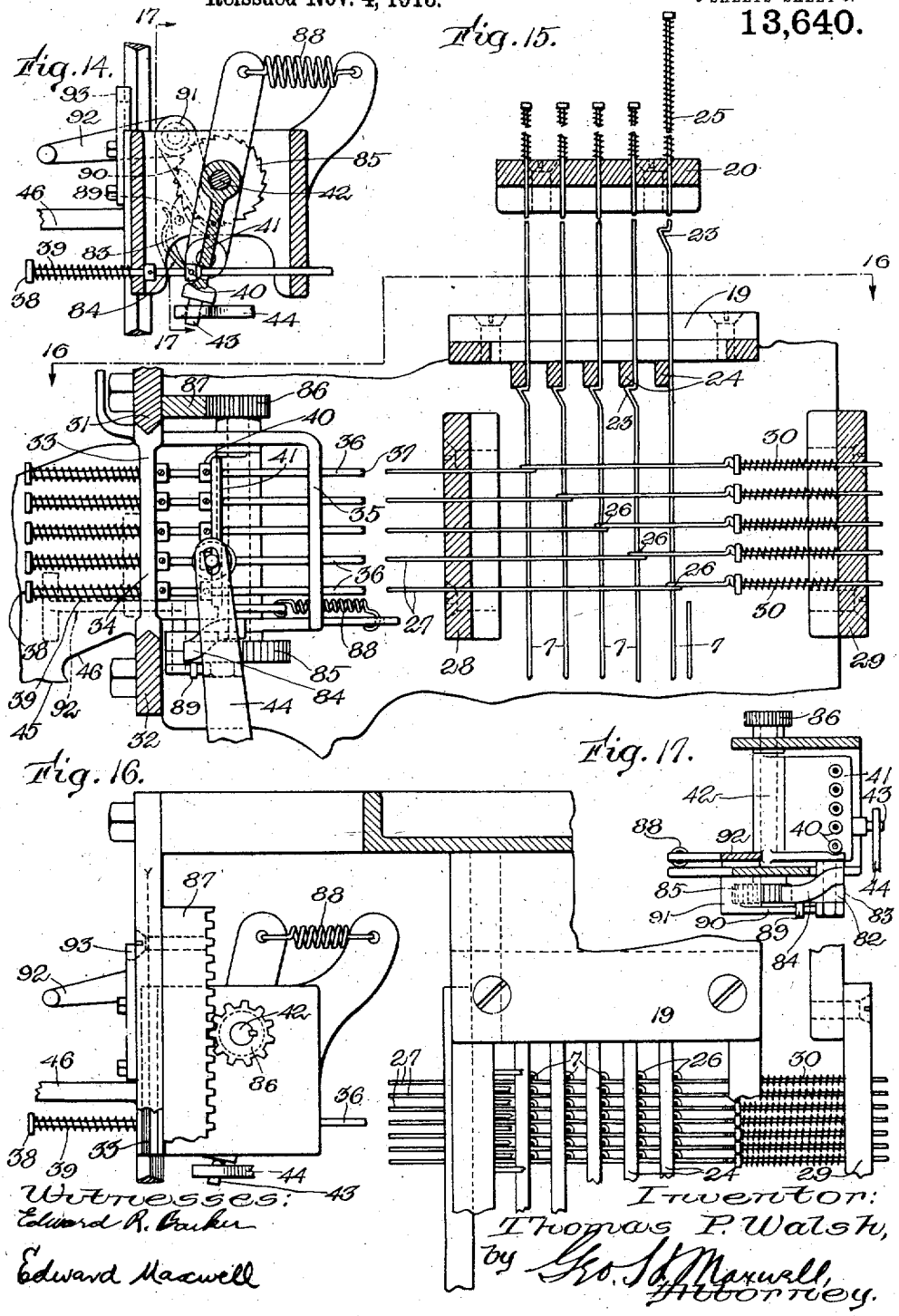

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

MACHINE FOR SELECTING, SPOOLING, SHEARING, AND DRAWING IN YARN FOR AXMINSTER LOOMS.

13,640. Specification of Reissued Letters Patent. Reissued Nov. 4, 1913.

Original No. 1,069,914, dated August 12, 1913, Serial No. 556,129. Application for reissue filed September 26, 1913. Serial No. 792,069.

*To all whom it may concern:*

Be it known that I, THOMAS P. WALSH, a citizen of the United States, and resident of Boston, in the county of Suffolk and State of Massachusetts, have invented an Improvement in Machines for Selecting, Spooling, Shearing, and Drawing in Yarn for Axminster Looms, of which the following description, in connection with the accompanying drawings, is a specification, like letters on the drawings representing like parts.

My invention is a machine for doing automatically what has heretofore been largely a hand operation, viz., it selects according to a pattern those yarns or colors from the yarn supply which are called for by the design of the goods to be woven, and then automatically delivers these selected yarns to a drawing-in device which draws them through the tubes of the tube frame and lays them on the spool, where they are wound in correct order and severed from the supply for delivery to an Axminster loom.

One of the principal objects of my present invention is to provide means for accomplishing all the foregoing movements, up to the winding, step by step from one end of the spool to the other so that the selecting of the yarns, drawing them in, and laying them on the spool, proceeds one yarn at a time.

The constructional details and further advantages of my invention will be pointed out more at length in the course of the following description taken with reference to the accompanying drawings, in which I have shown a preferred embodiment of the invention.

Figure 2:
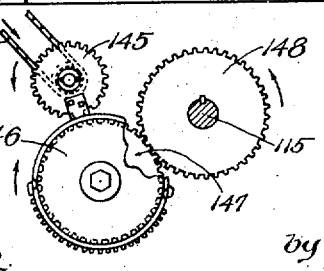
Figure 3:
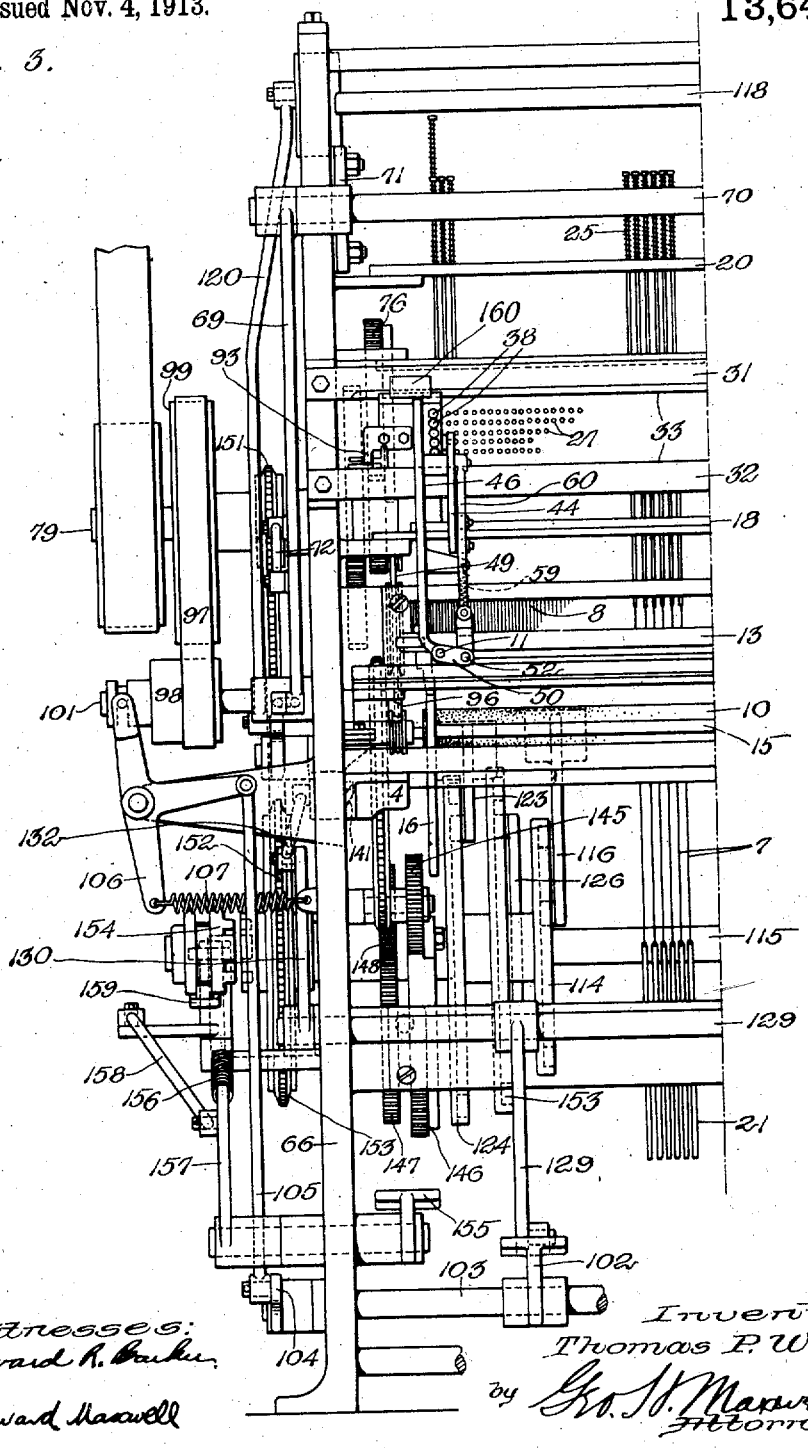
Figure 4:
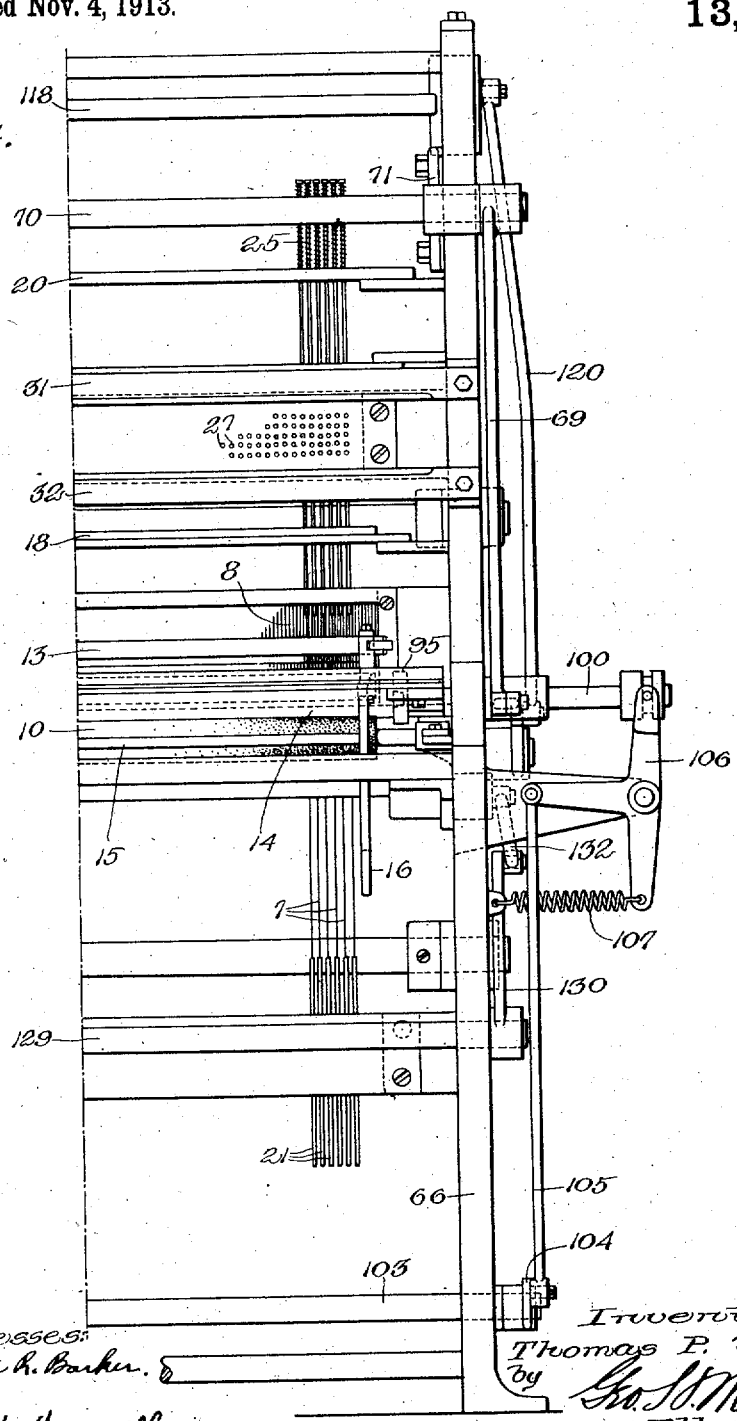
Figure 5:
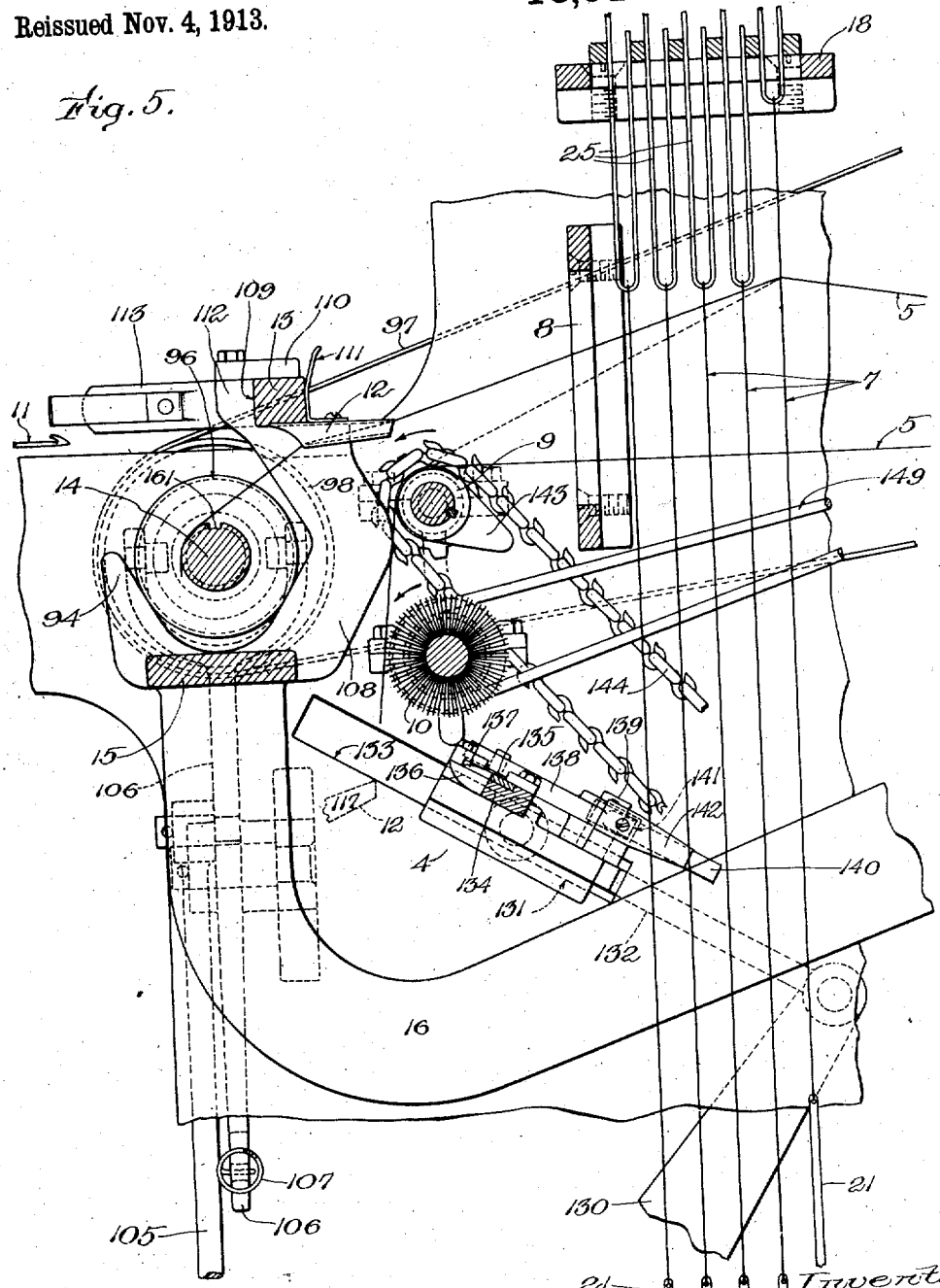

In the drawings, Figure 1 is a central longitudinal sectional view of the machine; Fig. 2 is a fragmentary sectional view showing in side elevation the driving gears for the revolving comb; Figs. 3 and 4 are views in front elevation showing respectively the left-hand end and the right-hand end portions of the machine. Fig. 5 is an enlarged sectional detail of the central sectional detail similar to Fig. 1, showing the central group of mechanism, particularly the winding and severing mechanism. Figs. 6–11 are views of the drawing-in mechanism; Fig. 6 being a vertical cross-sectional view on the line 6—6; Fig. 7, Fig. 7 being an enlarged sectional view showing in side elevation the drawing-in hook; Fig. 8 being an enlarged cross-sectional view of the hook, showing its controlling pin; Fig. 9 being a fragmentary view in end elevation of the long bearing for the hook; Fig. 10 being a development or partially diagrammatic view of the bearing to show its cam arrangement, and Fig. 11 being a plan view, parts broken away and sectioned, of the mechanism shown in Fig. 7; Fig. 12 is a sectional view showing in side elevation the cam and levers for pushing down the selected yarns; Fig. 13 is a fragmentary view partly in section, showing in plan a portion of the severing mechanism; Fig. 14 is an enlarged horizontal cross-sectional detail of a portion of the selecting mechanism; Fig. 15 is an enlarged vertical sectional view of the main portion of the selecting mechanism looking at the lower end of Figs. 14 and 16 and the right-hand end of Fig. 17; Fig. 16 is a horizontal sectional view taken on the line 16—16 Fig. 15; and Fig. 17 is a vertical sectional view on the line 17—17, Fig. 14.

The main object of my present invention, as already stated, is to accomplish the yarn selecting and drawing-in step-by-step, although it will be understood that my invention has other important and advantageous features of novelty. I believe that this step-by-step arrangement of yarn selecting and drawing-in mechanism is broadly novel, and accordingly I wish it understood that the preferred mechanism for carrying out these features, as herein shown, is illustrative merely and that any other selective and drawing-in mechanism may be substituted therefor within my invention considered from this broad standpoint. The selective mechanism herein shown is hand operated and is indicated at 1, Fig. 1, the drawing-in mechanism being indicated at 2, the winding mechanism at 3 and the severing mechanism at 4.

The supply of yarns 5 of the requisite kinds and colors is derived from any suitable source as from a usual creel (not shown) whence the yarns are brought over tension rods 6 to controlling mechanism, herein shown as comprising heddles 7, being thence led through a reed 8 and thence over a rotating comb 9, into the path of a rotating straightener or brush 10. The yarns when selected from this body are raised one at a time by the heddles and drawn individually by a hook 11 through the tubes 12 of a tube frame 13 and thence led or dropped onto a usual spool 14, said tube frame and spool being both carried at the end of a carrier 15 supported by arms 16 from a rock-shaft 17. The heddles are supported in guiding frames 18, 19, and 20 at their upper ends and provided with weights or lingoes 21 at their lower ends, guided in a usual lingo box 22. The details of the heddle controlling mechanism are best shown in Figs. 5, 15, 16. Each heddle has an offset finger or bend 23 in position to engage the under side of a cross bar 24 of the guide frame 19, and is provided with a spring 25 at its upper end bearing on the guide frame 20 to raise the heddle whenever the shouldered part 23 is moved rearwardly from beneath the cross bar 24 and thereby raise the selected yarns as clearly shown in Figs. 5 and 15. Each heddle passes through an eye 26 of an indicator wire 27 mounted to reciprocate in opposite supporting members or guide boards 28, 29 and normally held forward by a spring 30. While the step-by-step operation of the parts just described and of further parts yet to be described may be accomplished in various ways, I prefer to accomplish it by a hand operated mechanism operating on the key board principle. Accordingly, mounted on transverse tracks 31, 32 is a carriage 33 in the front plate 34 and rear plate 35 of whose frame are mounted pushers or actuators shown as key rods 36 corresponding in number to the number of heddles or colors in each set, being mounted in accurate alinement with the indicating wires 27 and preferably cupped at their inner ends 37 in order to engage with certainty the ends of said wires 27 when the pushers are pushed in. Each pusher or key rod has an enlarged head or finger rest 38 at its outer end, constituting a visual indicator to the operator and is normally held outward by a spring 39. Each key rod carries a stop 40 secured thereto in position to engage with its beveled inner end, see Fig. 14, the outer end of a web-like lever 41 pivoted loosely on a shaft 42 and provided at its outer end with a stud 43 which engages the slotted upper end of a lever 44. This lever 44 is pivoted at its lower end on a branch 45 of an arm or heavy bracket 46 which projects forward from the carriage 33. This arm or bracket 46 terminates at its lower end in a long cylindrical bearing 47 and carries the drawing-in mechanism. In this bearing 47 is mounted the hook 11, which carries a controlling pin or stud 48 see Fig. 8, to travel in a cam groove 49 which extends longitudinally of the bearing 47 for giving the requisite rocking movement to the hook 11 as it is reciprocated in its drawing-in action. In Fig. 10 I have shown a development of this cam groove, said figure showing the same as if Fig. 9 were split down at its upper part on the line $x$ and then opened out flat, thus showing the shape of the cam groove 49. Pivoted at the ends of the bearing 47 on the hook 11 by means of ears 50 is a yoke 51 which carries at its forward lower ends, *i. e.*, at the front ends of the ears 50 a rod 52, said rod having a notch 53 in position and of proper shape to fit down over a rib 54 of a transverse slide frame 55 which is mounted in the front of the machine to operate the drawing-in hook. This rod 52 slides freely in the ears 50 of the yoke 51 and is secured by a pin 56 at its inner end to a connector 57 pivoted on the hook 11 and held to move longitudinally therewith by means of two collars 58 fast on said hook as best shown in Fig. 11. Thus when the slide frame 55, engaged with the notch 53 of the rod 52, slides inward and outward in its drawing-in movement, it correspondingly reciprocates the hook 11, the latter being rocked as required by the engagement of its stud 48 with the cam 49. This movement takes place only when the selecting mechanism has been properly operated, said engagement of the notch 53 with the rib 54 of the slide 55 taking place only when the yoke 51 is positively lowered. The yoke is normally held upward by a spring 59 and is lowered in opposition to said spring by a link 60 pivoted to the yoke at its lower end and at its upper end to a bell-crank 61 pivoted at 62 to the arm or bracket 46 and connected by a link 63 to the lever 44 of the actuating mechanism of the selective apparatus. Thus each time the operator selects a color or yarn by pushing in upon one of the visual indicators 38 of the key board mechanism he thereby swings downwardly the yoke 51 and brings into operative position the drawing-in hook 11, which is instantly operated by its engagement with the reciprocating carriage 55. This carriage is preferably operated continuously, a slight dwell being provided at the end of its outward movement in order to facilitate the engagement therewith of the notch 53 of the drawing-in mechanism.

The ends of the carriage 55 are provided with slides 64, which travel in guide ways 65 provided in the opposite frame ends 66, said slides 64 being pivotally connected to links 67 pivoted at 68 to the lower ends of levers 69 fast on a rock shaft 70 journaled in brackets 71, the left-hand one of said levers 69 being pivotally connected to a rod 72 actuated by a crank 73 on the end of a shaft 74 which carries a mutiliated gear 75 driven by a coöperating mutilated gear 76 in well known manner, actuated by a pinion 77 and gear 78 from the main driving shaft 79. As the hook-operating rod 52 presents little frictional resistance, being preferably round, it can readily slide along the rib 54 of the actuator 55 until its notch 53 arrives at the proper position, in case the operator presses in a key rod out of time with the actuator 55. In such case, the operator is warned to maintain his pressure on the key by the fact that the key rod cannot move inwardly its full distance, and the operator soon learns to follow the movement or timing of the actuator 55 almost automatically.

As already explained, the drawing-in mechanism and the key board selective mechanism have a step-by-step feeding movement in order that the selections and drawing-in may be accomplished one thread at a time. As herein shown, the key board carriage and the drawing-in hook and accompanying parts are carried together, being connected by the bracket 46, the step-by-step feeding mechanism being provided in connection with one or the other of these mechanisms, preferably and as herein shown, in connection with the key board carriage. In order that the forward feeding or step-by-step movement shall not take place until the drawing-in hook has completed its forward and back movement, I provide means which prevents the feeding mechanism becoming operative until after the completion of the drawing-in movement. In the machine of the drawings, an outwardly extending rigid shelf 80, Figs. 6, 7, 9, 11, extends forward from the bearing or hub-like end 47 of the bracket 46, and the rod 52 is provided with a lump or raised cam portion 81, best shown in Fig. 7, which is beneath the shelf 80 in the forward and backward movements of the drawing-in hook 11 so that the notch 53 and rib 54 cannot possibly become disengaged until the rod 52, and hence the hook 11 have been returned to their starting position, and for the same reason the yoke 51 and the connected parts 60, 61, 63, and 44 are likewise prevented from returning to starting position until the completion of the drawing-in movement. This operates to hold the lever 44 and hence the lever 41 in their rearward postion. The lever 41 on its front lower end, see Fig. 17, is provided with a depending stud 82 on which is loosely pivoted a pawl 83, see also Fig. 14, held by a spring 84 in engagement with a ratchet wheel 85 fast on the lower end of the shaft 42 which at its upper end carries a toothed gear 86 in mesh with a rack 87, see Fig. 16, fast on the adjacent stationary track 31. A spring 88 normally tends to return the lever 41 to its forward position and thereby through the pawl 83 and ratchet 85 rotate the shaft 42 and gear 86 with relation to the rack 87, thus causing the forward step-by-step movement. To release this feeding movement and permit the key board carriage and drawing-in mechanism to be shifted back again to starting position at the end of a selection of yarns for an entire spool, the pawl 83 is provided with a down-hanging pin 89 in position to be engaged by the end 90 of an elbow lever whose hub is pivoted at 91 and whose other end 92 extends outwardly to be engaged by the hand, so that when this lever 92 is moved away from the keys, it thereby releases the feeding mechanism, and upon engaging with a stop 93, further pressure results in moving the carriage and drawing-in mechanism back to the left-hand side of the machine (provided the left hand end is used as the starting end). Referring now to Figs. 1, 3, 4, and 5, the spool carrier 15 is provided at its upper end with a crotch 94 for receiving the spool 14 in position to be engaged by end winding disks 95, 96, the latter being positively driven by a belt 97 and pulleys 98, 99, from the main driving shaft 79. The disks 95, 96 are carried respectively by shafts 100 and 101, moved inwardly into clamping position by the downward movement of a treadle 102, Fig. 1, rock shaft 103, levers 104, rods 105, and T-levers 106 against the action of springs 107.

At the rear side of the crotch 94 I provide end brackets 108 terminating at their upper ends with seats 109 for the tube frame 13, which is secured in place by buttons 110 on top and springs 111 at the rear, one at each end of the tube frame, the upper neck-end 112 of the bracket serving as a locating device to coöperate with the end part 113 of the tube frame to locate the tube frame accurately in the machine. Thus the spool and tube frame are carried together so that when the carrier 15 is moved downwardly after the drawing-in of the yarns and winding of the spool, both the tube frame and spool are moved together in their proper relative positions. This downward movement is effected by a cam 114 on the cam shaft 115 acting through a lever 116 fast on the shaft 17 which carries the arm 16 of said carrier 15. The cam 114 causes the arms 16 to move the spool and tube frame down from the position shown in Fig. 5 until it reaches approximately the position indicated at 117, Fig. 5. As this downward movement of the drawn-in and wound spool and tube frame is taking place, two other movements coöperate therewith. All the raised heddles are lowered, thereby lowering the wound yarns from their raised or selected position, so that said lowering of the yarns coöperates with the downward swinging of the spool to permit the latter movement without undue pulling strain on the yarns. Said downward movement of the heddles is accomplished by the downward movement of a top cross plate 118 guided in guideways 119 in the ends of the frame of the machine, being lowered by links 120, levers 121, rock shaft 122, cam lever 123, and path cam 124, see Fig. 12. At the same time, the cam 125, acting through the bent lever 126 on a rod 127 and crank lever 128 rocks a rock shaft 129 and its end levers 130 to move forwardly and upwardly the severing mechanism 4 into position to sever the yarns at the proper distance in front of the small ends of the tubes 12 as said yarns are moved downward into proper position to be severed. The levers 130 are connected to the slide ends 131 of the severing mechanism by means of links 132. These slide ends travel in guideways or slots 133 in the frame of the machine. The severing mechanism consists of a lower knife bar 134 on which is mounted to move longitudinally a reciprocating knife bar 135, said bars having finger-like cutters 136, 137, the movable bar 135 being actuated by a lever 138 pivoted at 139 and having a tail 140 extending in the path of a cam actuator 141 to move the bar 135 to the right, Fig. 13, as the severing mechanism reaches the upward extent of its movement, said bar being returned to inoperative position by a spring 142 as the severing mechanism moves back. As soon as the yarn is severed, the tube frame and spool with their complement of selected yarns are removed from the machine and empty ones put in place. As soon as the yarns are severed, their ends are immediately and automatically straightened out by the teeth 143 of the comb 9, actuated by a sprocket chain 144 and the gears 145, 146, 147, 148, shown best in Fig. 2. The gears 145 and 146 are mutilated gears in order to give the comb an intermittent motion, maintaining rest during the drawing-in and winding operations and while the spool carrier is being lowered and raised, the combing action taking place only just prior to the severing of the yarns so that, when the yarns are severed, the yarns left in the machine will be maintained by the comb separate and straight in their correct order. The straightening of the yarns is still further facilitated by the continuously rotating brush 10, which is driven by a belt 149 passing under an idler 150 which holds it down from interfering with the reed, and thence over a pulley 151 on the main driving shaft 79. A sprocket chain 152 from the driving shaft 79 passes over a sprocket wheel 153 loose on the cam shaft 115 in position to be clutched thereto by a clutch 154 actuated by a foot lever 155 in opposition to a spring 156, said foot lever controlling an arm 157 and link 158 connecting with the clutch shipping mechanism 159.

In operation, an empty spool having been placed in the crotch 94 of the spool carrier 15 when the latter is in its lowered position, and the tube frame 13 secured in the seats 109 on said carrier in proper relation to the spool, the operator depresses the treadle 155 and thereby causes the cam 114 to swing the arms 16 so as to lift said spool and tube frame into correct position as shown in Figs. 1 and 5 for receiving the selected yarns. The treadle 155 is then released, and the operator proceeds to select and draw-in the yarns according to the pattern. The pattern is preferably located conveniently with relation to the selecting mechanism 1, being herein shown for convenience in reduced form at 160, Fig. 1, secured to move with the keyboard carriage, it being sufficient to represent said pattern illustratively in this manner to indicate that it is to be provided in connection with the selective mechanism, in order that the operator may conveniently follow the same. The operator pushes in that key rod 36 of the bank or series of key rods of the carriage which is called for by the pattern, and holds the same with inward pressure until the slide frame 55, Fig. 7, reaches its outermost position so as to permit the notch 53 to engage therewith under the impulse of said inward pressure, whereupon the corresponding indicator wire 27 is moved rearwardly by said inwardly pressed key rod, and shifts the selected heddle 7 rearwardly to permit its shoulder 23 to disengage from the adjacent cross bar 24, whereupon its spring 25 instantly raises said heddle, thereby holding the selected yarn in raised position as shown by the dotted line Fig. 5, ready to be engaged by the hook 11 which is now on its way inward to engage said lifted yarn. As the hook moves inward and just before it reaches the selected yarn, it is rocked from its vertical position to approximately horizontal position by the cam 49 in the long tubular bearing 47 of its carrier, so that when it is moved back again by the lever 69 and actuating parts 72—78, it cannot fail to engage and take with it the selected yarn. As it goes back with the yarn, it is given a quarter-turn back into upright position, as required for its passage through the tube, thereby also slightly twisting the yarn in its grip, still further insuring the retention of the yarn as it passes backward through the tube of the tube frame from pulling the yarn through the tube from the small end to and out of the large end. As the yarn is drawn through the tube frame, it slides along the hook and finally drops from the hook down onto the spool as shown in Fig. 5. While the hook 11 is being moved forward and back again, its actuating member or rod 52 is maintained in downward positive engagement with the rib 54 of the slide 55 by the engagement of the overhanging shelf 80 with its cam projection 81, which also, by reason of the positive connecting members 60—63, prevents the keyboard carriage from being shifted, as said shifting thereof would of course also shift the drawing-in mechanism and thereby bend the hook 11 and disarrange and possibly injure the various other parts. This same mechanism also relieves the operator of the necessity of holding his finger on the key 38, which is retracted by its spring 39 as soon as the yarn has been selected. As soon as the cam projection 81 of the hook actuator 52 is fully restored to its starting position, it escapes from the restraint of the shelf 80, whereupon the spring 59 instantly raises the yoke 51 and, through the connected parts 60—63, and 44, permits both the keyboard carriage and the drawing-in mechanism to be fed along one step so as to bring them into operative position for the next yarn selected. This process is repeated for each yarn, the operator simply pressing in the particular key rod 36 called for by the pattern, and the machine thereupon accomplishes all the rest. The operator selects the yarn and, by the same selective movement, automatically couples the drawing-in hook with its operating mechanism so that it is instantly actuated to draw-in the particular yarn which has thus been selected and place the same in correct position through the tube of the tube frame and onto the spool. When the tube frame and spool have thus been brought with their required complement of yarns selected in accordance with the pattern 160, the yarns are clamped onto the spool by a usual clamping rod in the slot 161, whereupon the operator depresses the treadle 102, thereby clamping the winding mechanism into engagement with the ends of the spool, which is quickly wound with the required lengths of yarn. As the yarns are thus all wound under absolutely uniform tension and are subsequently severed in perfect alinement with each other, the usual waste of yarn is eliminated which has heretofore resulted from the necessity of trimming the yarn ends after the spool has been wound and then separately drawn-in, and from the uneven tension of the different yarns. As soon as the winding has been completed, the operator releases the treadle 102 and again depresses the treadle 155, thereby lowering the spool and tube frame with their complement of yarns into the position indicated at 117, Fig. 5. Just before they reach their lower position, the comb 9 is rotated as indicated by the arrow, so as to straighten out all the yarns, both those which have been selected and the others which may have been disturbed by said selection, and while the lowering is taking place, the raised yarns are being lowered by the cross plate 118 from their selected or shed position. Thereupon the severing mechanism 4 is moved upwardly, and just as it reaches the yarns which are held taut between the comb and the small ends of the tubes of the tube frame, said yarns being then in position between the cutting teeth 136 of the severing mechanism, the knife bar 135 of the latter is given a quick longitudinal severing movement by the engagement of the tail 140 of its actuating lever 138 with the cam 141. While this cutting of the threads is taking place, the cross plate 118 is being raised again into position to permit the proper operation of the selective mechanism for a second spool, and the severing mechanism is being restored to its inoperative down position. The operator then releases the treadle 155, and then he releases the tube frame from its clamped position and swings its ends 113 downwardly and snaps them into engagement with the spool, which is then removed from the machine ready for use in the Axminister or Moquette loom. A fresh spool and tube frame are then put in place, the treadle 155 lowered so as to raise them into operative position, as shown in Fig. 5, and the process above described is replaced.

Several advantages result from having both the yarn-selecting and drawing-in accomplished step by step. It is not only rapid, but permits the operator to watch the drawing-in with as much care as the selecting. Moreover, it is very light-running, and permits the employment of considerable of the mechanism which is at present in use. In fact, one object of my invention has been to devise a rapid, automatic machine for effecting the drawing-in movement as nearly as possible the same as now common in the hand method of laying the thread, whereby the operators who are already trained to the latter method will more readily fall into line with the automatic machine. Instead of drawing the thread in from the big end of the tubes and out at the small end thereof, I reverse the direction, thereby gaining the advantage of having the hook advance into the more readily entered large end of the tube and effecting the drawing-in prior to the winding of the spool. This renders it feasible to accomplish the selecting, drawing-in, winding, and cutting all in one machine, instead of requiring separate machines. Also, by not severing the yarn until after it is drawn-in, the trimming of the yarn and consequent waste is rendered unnecessary. It will be understood that while I prefer to employ a hand controlled selective mechanism, I do not intend to limit my invention thereto. By maintaining the yarns which are selected one by one raised until after the winding operation, the latter operation does not tend to interfere with and disturb the position of the unselected yarns, and, when the winding takes place, the yarns thus held raised away from the others pull much freer than otherwise.

Having described my invention, what I claim as new and desire to secure by Letters Patent is:

1. In a machine of the kind described, the combination with means for delivering a supply of yarns, and means for supporting a tube frame in position to be provided with a complement of yarns from said supply, of selecting mechanism for selecting from said yarns the desired complement thereof required for the tubes of said tube frame, and means for drawing-in the selected yarns one at a time into the respective tubes of said tube frame.

2. In a machine of the kind described, the combination with yarn-selecting mechanism, of means for drawing in the selected yarns one at a time, and means for thereafter winding said yarns on a spool.

3. In a machine of the kind described, the combination with pattern-selective means for selecting one yarn at a time, a general source of said yarn supply, and means for supporting a tube frame and its tubes in position for the selected yarns to be drawn into said tubes, of means for drawing-in each yarn as selected.

4. In a machine of the kind described, the combination with yarn-selective mechanism, including governing means for determining the yarns to be selected, of step by step drawing-in mechanism to draw-in one yarn at a time, and means to support a series of tubes in position to receive said yarns.

5. In a machine of the kind described, a general source of yarn supply, and yarn-selective mechanism for choosing certain yarns from among the general supply of yarns, combined with drawing-in mechanism under the control of said selective mechanism, and means for supporting the tubes in position to receive the selected yarns.

6. In a machine of the kind described, the combination with step by step yarn-selective mechanism, of drawing-in mechanism, and means connected with the latter for preventing said selective mechanism from being operated at a second step position before the drawing-in mechanism has operated.

7. In a machine of the kind described, the combination with a general source of yarn supply, step by step yarn selective mechanism for choosing certain yarns from among said general supply of yarns and means for holding the tubes of a tube frame in position for the chosen yarns to be drawn through said tubes, of step by step drawing-in mechanism, and operating connections between said two step by step mechanisms containing means for effecting their step by step movements in unison.

8. In a machine of the kind described, the combination with a general source of yarn supply, step by step yarn selective mechanism for choosing certain yarns from among said general supply of yarns one at a time successively across the machine and means for holding the tubes of a tube frame in position for the chosen yarns to be drawn through said tubes, of drawing-in mechanism for drawing in one yarn at a time in the corresponding tube, the aforesaid mechanisms including means for advancing the drawing-in mechanism step by step to draw in the yarns successively across the machine.

9. In a machine of the kind described, a source of general yarn supply from which a complement of yarn is to be selected, means to support the tubes of a tube frame in position for the selected yarns to be drawn into said tubes, and yarn-selective mechanism, including controlling means for selecting a desired complement of said yarns, combined with a single drawing-in device for drawing all the selected yarns through said tubes, means to move said device into position to coöperate with the successive yarns, one at a time, and means to reciprocate said device with relation to each yarn.

10. In a machine of the kind described, the combination with a source of general delivery, yarn-selective mechanism for choosing certain yarns from among the general supply of yarns, of means to support a tube frame in position to receive the selected yarns, a drawing-in hook, and operating means for giving said hook a drawing-in movement through said tubes in succession.

11. In a machine of the kind described, the combination with means to support a tube frame, of means to draw-in the yarns through said tube frame one at a time, and means for thereafter winding the drawn-in yarns.

12. In a machine of the kind described, the combination with means for supporting a tube frame, and means for holding the yarns in alinement with said tubes, of means to draw-in the yarns one at a time through the successive tubes, and means for thereafter winding the yarns.

13. In a machine of the kind described, the combination with winding and supporting means for a spool on which yarns are to be wound, and means for delivering the said yarns to be wound on said spool, of means for supporting the tubes of a tube frame, and means for drawing-in the yarns one at a time into the tubes of the tube frame.

14. A machine of the kind described, comprising yarn-selecting mechanism, winding mechanism, and automatic means to move the selected yarns one at a time to said winding mechanism.

15. A machine of the kind described, comprising yarn-selecting mechanism, winding mechanism, means to move the selected yarns one at a time to said winding mechanism, and automatic means for severing the yarns when wound.

16. A machine of the kind described, comprising yarn-selective mechanism, including vertically movable heddles normally held in down position, selective means for releasing a selected heddle, means for individually raising each heddle as selected, to hold the selected yarn in raised position, winding mechanism, and means to move the selected yarns one at a time to said winding mechanism.

17. A machine of the kind described, comprising yarn-selective mechanism, including vertically movable heddles normally held in down position, selective means for releasing a selected heddle, means for individually raising each heddle as selected, to hold the selected yarn in raised position, means to support a tube frame, and means to draw-in the selected yarns through said tube frame one at a time.

18. A machine of the kind described, comprising yarn-selective mechanism, including vertically movable heddles normally held in down position, selective means for releasing a selected heddle, means for individually raising the selected heddles, to hold the selected yarns in raised position, and means to positively force downward the raised heddles to normal position, combined with winding mechanism, and mechanism to move the selected yarns to said winding mechanism while the heddles are in raised position.

19. A machine of the kind described, comprising yarn-selective mechanism, including vertically movable heddles normally held in down position, selective means for releasing a selected heddle, means for individually raising the selected heddles, to hold the selected yarns in raised position, means to positively force downward the raised heddles to normal position, means to support a tube frame, and mechanism for drawing-in the selected yarns through said tube frame while the heddles are in raised position.

20. A machine of the kind described, comprising yarn-selective mechanism, including vertically movable heddles each provided with locking means for locking it in down position, selective means for unlocking a selected heddle, and means for individually raising the selected heddles, to hold the selected yarns in raised position, combined with winding mechanism, and mechanism to move the selected yarns to said winding mechanism while the heddles are in raised position.

21. A machine of the kind described, comprising yarn-selective mechanism, including vertically movable heddles each provided with locking means for locking it in down position, selective means for unlocking a selected heddle, and means for individually raising the selected heddles, to hold the selected yarns in raised position, combined with means to support a tube frame, and mechanism for drawing-in the selected yarns through said tube frame while the heddles are in raised position.

22. A machine of the kind described, comprising yarn-selective mechanism, including a step by step actuator, a drawing-in device carried by and actuated step by step by said actuator, and means for giving said drawing-in device a drawing-in movement in each step by step position.

23. In a machine of the kind described, means to support a tube frame, a drawing-in hook, means to move said hook step by step to draw-in the yarns one at a time through the successive tubes of the tube frame, actuating means for reciprocating said drawing-in hook, and means for rocking the hook from tube-occupying position into yarn-engaging position for facilitating the passage of the same through the tube.

24. A machine of the kind described, comprising a drawing-in hook mounted for longitudinal movement, a continuously reciprocating actuator for moving said hook, and means under the control of the operator for connecting said hook with said actuator to be actuated thereby.

25. In a machine of the kind described, means for supporting a spool and tube frame in position to be supplied with a complement of yarns, drawing-in mechanism, winding mechanism, and means to lower said spool and tube frame entirely below said mechanisms to permit the removal of the spool and tube frame together.

26. In a machine of the kind described, a yarn-severing device, means to support a tube frame and a spool above said device in position to receive a complement of yarns, drawing-in mechanism to draw said yarns through the tubes of said tube frame, winding mechanism to wind the yarns on the spool, and means to lower said supporting means with said spool and tube frame in position for said severing mechanism to sever the yarns in proper relation to the tube frame.

27. In a machine of the kind described, means to support a supply of yarns, means to support a spool and tube frame to receive yarns from said supply, yarn straightening and alining mechanism, yarn-severing mechanism, and means for moving the spool and tube frame with their support into position for said straightening and alining mechanism to engage the yarns thereof prior to the severing of said yarns.

28. In a machine of the kind described, means to support a spool and tube frame, means to deliver yarns through the tubes of said tube frame and onto said spool, winding mechanism to wind the yarns on the spool, severing means, and mechanism for lowering said spool and tube frame with their support and raising said severing mechanism to sever the yarns of the lowered spool and tube frame.

In testimony whereof, I have signed my name to this specification, in the presence of two subscribing witnesses.

THOMAS P. WALSH.

Witnesses:
EDWARD R. BARKER,
EDWARD MAXWELL.